(12) United States Patent
Nayak

(10) Patent No.: US 12,034,777 B2
(45) Date of Patent: Jul. 9, 2024

(54) METHOD AND APPARATUS FOR RESTORING PROXY-CALL SESSION CONTROL FUNCTION IN A WIRELESS COMMUNICATION SYSTEM

(71) Applicant: Samsung Electronics Co., Ltd., Suwon-si (KR)

(72) Inventor: Ashok Kumar Nayak, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/163,525

(22) Filed: Feb. 2, 2023

(65) Prior Publication Data

US 2023/0247066 A1    Aug. 3, 2023

(30) Foreign Application Priority Data

Feb. 3, 2022  (IN) .............................. 202241005929
Jan. 12, 2023  (IN) ............................ 2022 41005929

(51) Int. Cl.
*H04L 65/1016* (2022.01)
*H04L 65/1046* (2022.01)
*H04L 65/1066* (2022.01)

(52) U.S. Cl.
CPC ...... *H04L 65/1016* (2013.01); *H04L 65/1046* (2013.01); *H04L 65/1066* (2013.01)

(58) Field of Classification Search
CPC ............. H04L 65/1016; H04L 65/1066; H04L 65/1046
See application file for complete search history.

(56) References Cited

U.S. PATENT DOCUMENTS

2008/0276003 A1* 11/2008 Dudley .............. H04L 65/1016
                                                                  709/242
2020/0178336 A1    6/2020 Li et al.
(Continued)

FOREIGN PATENT DOCUMENTS

| WO | 2019/154034 A1 | 8/2019 |
| WO | 2020/228471 A1 | 11/2020 |
| WO | 2021/044271 A1 | 3/2021 |

OTHER PUBLICATIONS

International Search Report dated May 18, 2023, issued in International Patent Application No. PCT/KR2023/001541.

*Primary Examiner* — Jungwon Chang
(74) *Attorney, Agent, or Firm* — Jefferson IP Law, LLP

(57) ABSTRACT

The disclosure relates to a 5th generation (5G) or 6th generation (6G) communication system for supporting a higher data transmission rate. A method performed by a session management function (SMF) node in a wireless communication system is provided. The method includes receiving, from the user equipment (UE), a protocol data unit (PDU) session establishment request for establishing at least one PDU session between the UE and multiple internet protocol (IP) multimedia subsystem (IMS) networks, subscribing, with a unified data manager (UDM) node to receive a first notification for a proxy-call session control function (P-CSCF) restoration, by providing an identifier for each PDU session, receiving, from the UDM node, the first notification for the P-CSCF restoration based on a subscription with a UDM, and performing, the P-CSCF restoration for the PDU session of the UE based on the received first notification for the P-CSCF restoration.

12 Claims, 10 Drawing Sheets

(56) References Cited

U.S. PATENT DOCUMENTS

| | | | |
|---|---|---|---|
| 2021/0021647 A1* | 1/2021 | Cai | H04L 65/1026 |
| 2021/0152615 A1* | 5/2021 | Karampatsis | H04L 65/1016 |
| 2021/0266349 A1 | 8/2021 | Foti | |
| 2022/0232051 A1* | 7/2022 | Zhu | H04L 65/1073 |
| 2023/0113082 A1* | 4/2023 | Sabeur | H04L 65/1104 |
| | | | 455/435.1 |
| 2023/0269661 A1* | 8/2023 | Xu | H04W 8/20 |
| | | | 370/328 |
| 2023/0276220 A1* | 8/2023 | Wang | H04W 8/10 |
| | | | 370/331 |
| 2023/0291607 A1* | 9/2023 | Patel | H04L 12/4633 |
| | | | 370/235 |

* cited by examiner

METHOD AND APPARATUS FOR RESTORING PROXY-CALL SESSION CONTROL FUNCTION IN A WIRELESS COMMUNICATION SYSTEM

CROSS-REFERENCE TO RELATED APPLICATION(S)

This application is based on and claims priority under 35 U.S.C. § 119(a) of an Indian provisional patent application number 202241005929, filed on Feb. 3, 2022, in the Indian Patent Office, and of an Indian non-provisional patent application number 202241005929, filed on Jan. 12, 2023, in the Indian Patent Office, the disclosure of each of which is incorporated by reference herein in its entirety.

BACKGROUND

1. Field

The disclosure relates to a field of Internet Protocol Multimedia Subsystem (IMS) in 3rd Generation Partnership Project (3GPP). More particularly, the disclosure relates to a Proxy-Call Session Control Function (P-CSCF) restoration of a User Equipment (UE) served by multiple IMS networks.

2. Description of Related Art

5th Generation (5G) mobile communication technologies define broad frequency bands such that high transmission rates and new services are possible, and may be implemented not only in "Sub 6 gigahertz (GHz)" bands such as 3.5 GHz, but also in "Above 6 GHz" bands referred to as Millimeter Wave (mmWave) including 28 GHz and 39 GHz. In addition, it has been considered to implement 6th Generation (6G) mobile communication technologies (referred to as Beyond 5G systems) in terahertz (THz) bands (e.g., 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive Multiple Input Multiple Output (MIMO) for mitigating radio-wave path loss and increasing radio-wave transmission distances in mmWave, supporting numerologies (e.g., operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, New Radio (NR) UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step Random Access Channel (RACH) for NR). There also has been ongoing standardization in system architecture/service regarding a 5G baseline architecture (e.g., service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

In 5G, a Session Management Function (SMF) performs a Proxy-Call Session Control Function (P-CSCF) discovery. After the P-CSCF discovery, the SMF provides a Proxy-Call Session Control Function (P-CSCF) address to a User Equipment (UE) for an IMS service. The P-CSCF address is provided to the UE when the UE establishes an IMS Protocol Data Unit (PDU) session with an IMS network for an IMS Data Network Name (DNN). The above process is applicable in a scenario when the UE is only served by one IMS network.

Recently studies have been conducted by 3GPP to address a requirement when the UE will be served by two different IMS networks through different slices. The Technical Report (TR) 23.700-10 concluded this study, and two solutions were agreed upon.

According to an agreed solution 1 in the TR 23.700-10, it was concluded that these IMS networks will be differentiated by having different DNNs which will include a corresponding IMS home network domain name information or operator information. Thereafter, the SMF will provide the P-CSCF address to the UE during the PDU session establishment when the UE sends the DNN. The P-CSCF address matches the UE provided DNN.

According to an agreed solution 2 in the TR 23.700-10, it was concluded that UE should be provided the IMS home network domain name should be sent in a UE Route Selection Policy (URSP) along with the slice name. Thus, when the UE initiates the PDU session for a particular IMS network, the IMS client will be able to choose the corresponding slice & IMS home network domain for the IMS procedure based on the URSP rule.

The above information is presented as background information only to assist with an understanding of the disclosure. No determination has been made, and no assertion is made, as to whether any of the above might be applicable as prior art with regard to the disclosure.

SUMMARY

This summary is provided to introduce a selection of concepts in a simplified format that are further described in the detailed description of the disclosure. This summary is not intended to identify key or essential inventive concepts of the disclosure, nor is it intended for determining the scope of the disclosure.

Aspects of the disclosure are to address at least the above-mentioned problems and/or disadvantages and to provide at least the advantages described below. Accordingly, an aspect of the disclosure is to provide an apparatus and method described below.

Additional aspects will be set forth in part in the description which follows and, in part, will be apparent from the description, or may be learned by practice of the presented embodiments.

In accordance with an aspect of the disclosure, a method and system for Proxy-Call Session Control Function (P-CSCF) restoration of a UE served by multiple IMS networks at a network node are provided. The method at the network node includes receiving, from the UE, a protocol data unit (PDU) session establishment request of at least one PDU session between the UE and the multiple IMS networks. Thereafter, the method includes subscribing with a Unified Data Manager (UDM) to receive a notification for a P-CSCF restoration by providing an identifier for each PDU session, and then receiving the notification for the P-CSCF restoration from the UDM based on a subscription with the UDM node. The network node further performs, the P-CSCF restoration for the PDU session of the UE from the multiple IMS networks based on the received notification for the P-CSCF restoration.

In accordance with another aspect of the disclosure, a method and system for Proxy-Call Session Control Function (P-CSCF) restoration of a UE served by multiple IMS networks at Home Subscriber Server (HSS) are provided. The method at the HSS includes detecting a P-CSCF restoration failure in at least one of IMS network from the multiple IMS networks based on a network condition information. The method further includes triggering, by the HSS, a P-CSCF restoration based on the detection of the P-CSCF restoration failure and sending, a notification for the triggered P-CSCF restoration along with an identifier to a Unified Data Manager (UDM). The identifier includes one of a Data Network Name (DNN), an IMS home network domain name, and a P-CSCF address corresponding to the IMS network for which the P-CSCF restoration failure is detected. Further, the UDM sends another notification to the network node along with the received identifier from the HSS. Further, the network node identifies a protocol data unit (PDU) session of the UE from the multiple IMS networks based on a matching of a stored identifier with the identifier received from the HSS. The network node then performs the P-CSCF restoration for the identified PDU session.

In accordance with another aspect of the disclosure, a method and system for Proxy-Call Session Control Function (P-CSCF) restoration of a UE served by multiple IMS networks at a network node are provided. The method includes detecting a P-CSCF failure by the network node in at least one of an IMS network from the multiple IMS networks based on network condition information. The method further includes identifying a protocol data unit (PDU) session of the UE from the multiple IMS networks based on a matching of a stored identifier with the input using which the network node detected the P-CSCF failure. Thereafter, the network node performs the P-CSCF restoration for the identified PDU session. According to the aspect of the embodiment, the network node includes one of the Access Mobility and Management Function (AMF) or the SMF. According to the further aspect of the embodiment, the detection of P-CSCF failure by the SMF is based on a reception of a message from the Policy and Charging Rules Function/Policy Control Function (PCRF/PCF) node or from a User Plane Function (UPF). The input may be the identifier received from another PCRF/PCF node or from UPF. The identifier includes one of a Data Network Name (DNN), an IMS home network domain name, and a P-CSCF address corresponding to the IMS network for which the P-CSCF restoration failure is detected.

In accordance with another aspect of the disclosure, a method performed by a session management function (SMF) node in a wireless communication system is provided. The method includes receiving, from the UE, a protocol data unit (PDU) session establishment request for establishing at least one PDU session between the UE and multiple internet protocol (IP) multimedia subsystem (IMS) networks, subscribing, with a unified data manager (UDM) node to receive a first notification for a P-CSCF restoration, by providing an identifier for each PDU session, receiving, from the UDM node, the first notification for the P-CSCF restoration based on a subscription with the UDM node, and performing, the P-CSCF restoration for the PDU session of the UE based on the received first notification for the P-CSCF restoration.

In one embodiment, wherein the identifier includes at least one of a data network name (DNN), an IMS home network domain name, or a P-CSCF address.

In one embodiment, wherein receiving the first notification for the P-CSCF restoration from the UDM node is based on a triggering of the P-CSCF restoration by a home subscriber server (HSS).

In one embodiment, wherein the method further comprises storing the identifier during an initial PDU session establishment by the UE with the multiple IMS networks.

In one embodiment, wherein the method further comprises detecting a P-CSCF restoration failure in at least one IMS network from the multiple IMS networks based on network condition information, identifying the PDU session of the UE from the multiple IMS networks based on a matching of a stored identifier with an identifier received from the HSS, and performing the P-CSCF restoration for the identified PDU session.

In one embodiment, wherein the detection of the P-CSCF failure is based on a reception of a message from policy and charging rules function/policy control function (PCRF/PCF) node or from a user plane function (UPF) node.

In accordance with another aspect of the disclosure, a session management function (SMF) node in a wireless communication system is provided. The SMF node includes at least one transceiver and a controller coupled with the at least one transceiver, and configured to receive, from the UE, a protocol data unit (PDU) session establishment request for establishing at least one PDU session between the UE and multiple internet protocol (IP) multimedia subsystem (IMS) networks, subscribe, with a unified data manager (UDM) node to receive a first notification for a P-CSCF restoration, by providing an identifier for each PDU session, receive, from the UDM node, the first notification for the P-CSCF restoration based on a subscription with the UDM node, and perform, the P-CSCF restoration for the PDU session of the UE based on the received first notification for the P-CSCF restoration.

In one embodiment, wherein the identifier includes at least one of a data network name (DNN), an IMS home network domain name, or a P-CSCF address.

In one embodiment, wherein receiving the first notification for the P-CSCF restoration from the UDM node is based on a triggering of the P-CSCF restoration by a home subscriber server (HSS).

In one embodiment, wherein the controller is further configured to store the identifier during an initial PDU session establishment by the UE with the multiple IMS networks.

In one embodiment, wherein the controller is further configured to detect a P-CSCF restoration failure in at least one IMS network from the multiple IMS networks based on network condition information, identify the PDU session of the UE from the multiple IMS networks based on a matching of a stored identifier with an identifier received from the HSS, and perform the P-CSCF restoration for the identified PDU session.

In one embodiment, wherein the detection of the P-CSCF failure is based on a reception of a message from policy and charging rules function/policy control function (PCRF/PCF) node or from a user plane function (UPF) node.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Figure 1:
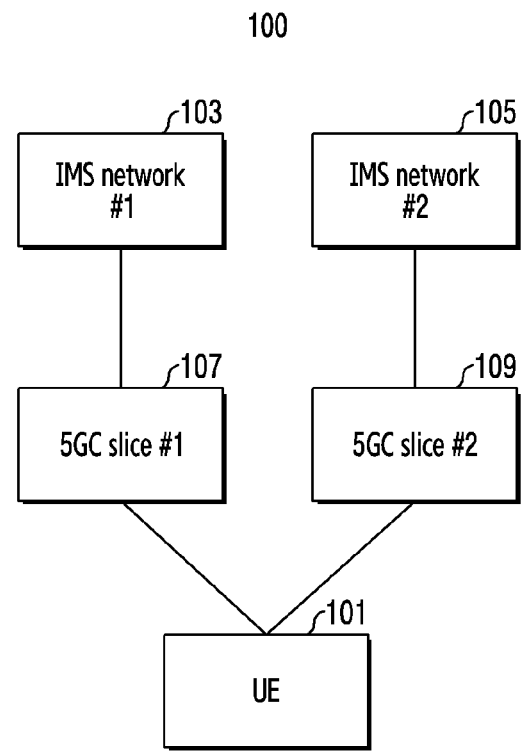
FIG. 1 illustrates an existing operational flow diagram depicting a process for a UE connecting to two IMS networks through two 5G Core (5GC) network slices, according to the related art.

Further, skilled artisans will appreciate that the elements in the drawings are illustrated for simplicity and may not have been necessarily been drawn to scale. For example, the flowcharts illustrate the method in terms of the most prominent operations involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having the benefit of the description herein.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be understood at the outset that although illustrative implementations of the embodiments of the disclosure are illustrated below, the disclosure may be implemented using any number of techniques, whether currently known or in existence.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein are for describing, teaching, and illuminating some embodiments and their specific features and elements and do not limit, restrict, or reduce the spirit and scope of the claims or their equivalents.

More specifically, any terms used herein such as but not limited to "includes," "comprises," "has," "consists," and grammatical variants thereof do not specify an exact limitation or restriction and certainly do not exclude the possible addition of one or more features or elements, unless otherwise stated, and must not be taken to exclude the possible removal of one or more of the listed features and elements, unless otherwise stated with the limiting language "MUST comprise" or "NEEDS TO include."

Whether or not a certain feature or element was limited to being used only once, either way, it may still be referred to as "one or more features", "one or more elements", "at least one feature" or "at least one element." Furthermore, the use of the terms "one or more" or "at least one" feature or element does not preclude there being none of that feature or element unless otherwise specified by limiting language such as "there NEEDS to be one or more" or "one or more element is REQUIRED."

Unless otherwise defined, all terms, and especially any technical and/or scientific terms, used herein may be taken to have the same meaning as commonly understood by one having ordinary skill in the art.

The disclosure discloses a method and system for a P-CSCF restoration for the UE served by multiple different IMS networks through different slices. According to the disclosed methodology, the HSS provides the Subscriber Permanent Identifier (SUPI) along with an identifier. The identifier includes one of a Data Network Name (DNN), an IMS home network domain name, and a P-CSCF address. The HSS then notifies the UDM for a triggered P-CSCF restoration along with the identifier. The UDM then sends a notification to a network node along with the identifier that is received from the HSS so that the network node may identify a PDU session from a multiple PDU sessions for the same SUPI for which the P-CSCF restoration needs to be triggered. The network node matches the identifier with a stored identifier to identify an exact PDU session. Thereafter performing restoration for the identified PDU session. A detailed explanation for the P-CSCF restoration of the UE served by the multiple IMS networks will be explained in the forthcoming paragraphs.

FIG. 1 illustrates an existing operational flow diagram depicting a process for a UE connecting to two IMS networks through two 5GC network slices, according to the related art. In the 5G, each 5GC network slice is associated with a separate and distinct IMS network.

Referring to FIG. 1, in an operational flow diagram 100 an IMS network (NW) #1 103 is associated with a 5GC slice #1 107 and an IMS network (NW) #2 105 is associated with a 5GC slice #2 109.

In this scenario, the UE 101 may establish different PDU sessions to get IMS services. The SMF provides the P-CSCF address for the corresponding network using the input provided by the UE. The input is either DNN which has the IMS home network domain name or the operator identifier (according to the so agreed solution 1) or through different slices or the IMS home network name (according to the agreed solution 2).

During the establishment of the IMS PDU session, an Access Mobility and Management Function (AMF) and/or the SMF subscribes for the P-CSCF restoration by providing the 'pcscfRestorationCallbackUri' address. When the P-CSCF restoration is triggered by a Home Subscriber Server (HSS) and an update about the trigger to a Unified Data Manager (UDM), the UDM notifies the AMF and/or the SMF to proceed with the restoration.

Also, in this new deployment where a Public Land Mobile Network (PLMN)/Stand-alone Non-Public Network (SNPN) supports more than one IMS network then AMF and/or SMF needs to know for which IMS network P-CSCF restoration needs to be triggered for the same UE, i.e., for a same Subscriber Permanent Identifier (SUPI) more than one IMS PDU session is there with corresponding IMS network.

Accordingly, when the UE is served by more than one IMS network AMF and/or SMF finds more than one PDU session for the same SUPI during the P-CSCF restoration procedure. Therefore, the SMF/AMF needs to differentiate between the PDU sessions when the P-CSCF restoration needs to take place.

Figure 2:
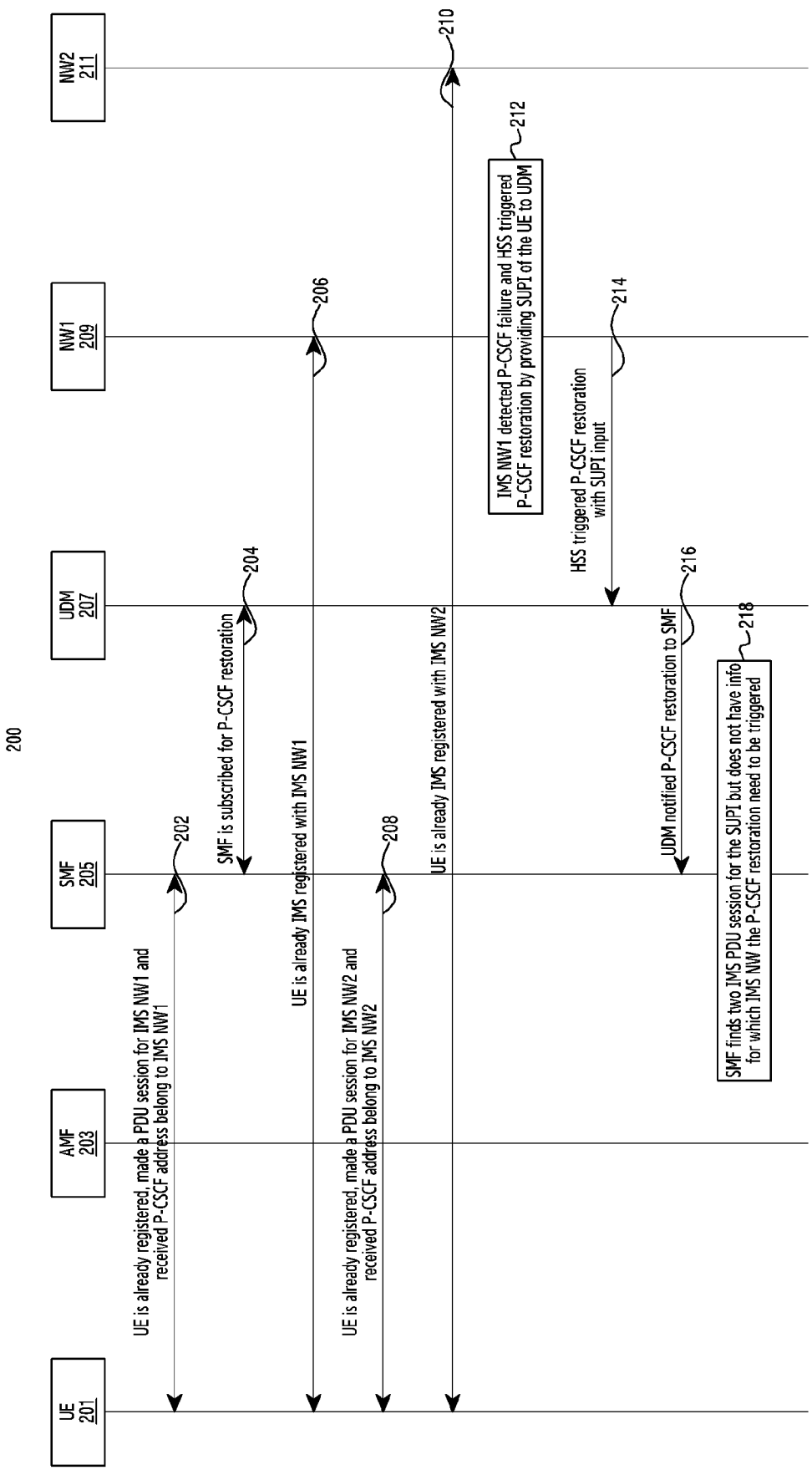
FIG. 2 illustrates an existing operational flow diagram depicting a process for an SMF based P-CSCF restoration when a UE is served by more than one network for IMS services, according to the related art.

FIG. 2 illustrates an existing operational flow diagram depicting a process for an SMF based P-CSCF restoration when a UE is served by more than one network for IMS services, according to the related art.

According to the operational flow 200, the UE 201 is served multiple IMS network. It is considered that the UE 201 is registered with an NW1 209 and an NW2 211. The operational flow 200 is explained with the help of the following operations mentioned below.

Referring to FIG. 2, at operation 202, the UE 201 initiates an initial PDU session for IMS services with the NW1 209 and receives a P-CSCF address associated with the NW1 209 as per TR 23.700-10 conclusion. At operation 204, the SMF 205 subscribes for the P-CSCF restoration to the UDM 207 as per existing TS 23.502. At operation 206, the UE 201 successfully is registered with NW1 209 for IMS services. At operation 208, the UE 201 initiates another PDU session for IMS services with NW2 211 and receives a P-CSCF address associated with the NW2 211 as per TR 23.700-10 conclusion. As this is a new PDU session but for the IMS service there is no action defined for the SMF for the P-CSCF restoration. Assuming the SMF 205 either would have done subscription for P-CSCF restoration again which it had already done at operation 204. Hence, no new call flow is shown toward UDM 207. At operation 210, the UE 201 successfully is registered with IMS NW2 211 for IMS services. As an example, and for the sake of simplicity, it is shown in FIG. 2 that the UE 201 is registered with two networks, i.e., the NW1 209 and an IMS NW2 211. However, the UE 201 may be served by any number of networks for IMS services.

Further, at operation 212, the NW1 209 detects the P-CSCF failure as per existing TS 23.380 procedures. Then, at operation 214, an HSS of the NW1209, triggers the P-CSCF restoration by providing a Subscription Permanent Identifier (SUPI) as per existing TS 29.503. At operation 216, the UDM 207 notifies the P-CSCF restoration to the SMF 205 with the SUPI as per existing TS 23.502 and TS 29.503. Accordingly, at operation 218, the SMF 205 does not know for which NW or the PDU session, the P-CSCF restoration needs to be triggered as the received SUPI is associated with two PDU sessions.

Figure 3:
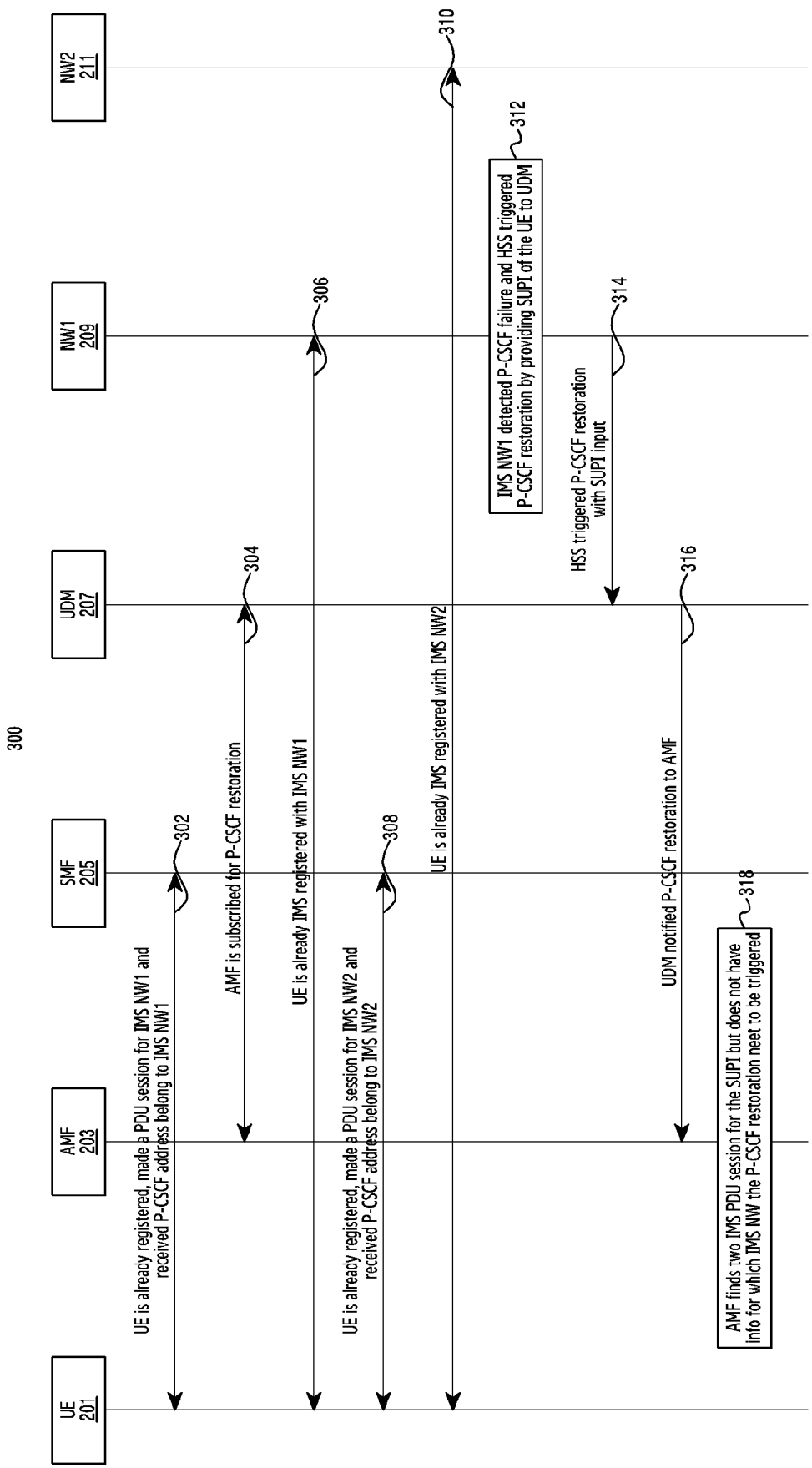
FIG. 3 illustrates an existing operational flow diagram depicting a process for an AMF based P-CSCF restoration when a UE is served by more than one IMS network, according to the related art.

FIG. 3 illustrates an existing operational flow diagram depicting a process for an AMF-based P-CSCF restoration when a UE is served by more than one IMS network, according to the related art.

According to an operational flow diagram 300, the UE 201 is served by multiple networks for IMS service. It is considered that the UE 201 is registered with an NW1 209 and an NW2 211. The operational flow diagram 300 is almost similar to the operation flow diagram 200. Therefore, a repetitive description is omitted herein and only operations that are different are explained below herein. Further, the reference numerals have been kept the same throughout the disclosure for ease of understanding of the disclosure.

Referring to FIG. 3, in an operation, the method performed in operations 302, 304, 306, 208, 310, 312 and 314 are similar to that of operations 202 through 214 of FIG. 2. Thus, a description of the same is omitted herein for the sake of brevity. In further operation, at operation 316, the UDM 207 notifies the P-CSCF restoration to the AMF 203 with the SUPI as per existing specifications TS 23.502 and TS 29.503. Accordingly, at operation 318, the AMF 203 does not know for which NW or the PDU session, the P-CSCF restoration needs to be triggered as the received SUPI is associated with two PDU sessions.

Accordingly, when the UE is served by more than one network for IMS services AMF and/or SMF finds more than one PDU session for the same SUPI. Thus, the SMF/AMF is unable to differentiate between the PDU sessions when the P-CSCF restoration needs to take place.

Thus, there lies a need for a method and system that is capable of identifying the PDU session of the UE from the multiple IMS networks.

Figure 4:
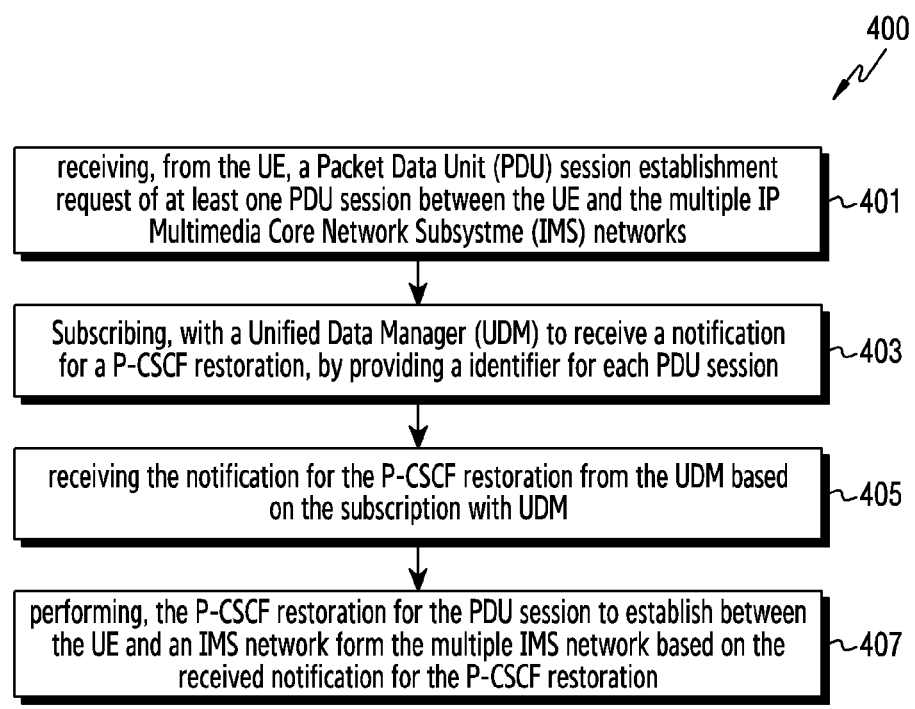
FIG. 4 illustrates a flowchart depicting a method performed at a network node for Proxy-Call Session Control Function (P-CSCF) restoration of a UE served by multiple IMS networks, according to an embodiment of the disclosure.

FIG. 4 illustrates a flowchart depicting a method performed at a network node for Proxy-Call Session Control Function (P-CSCF) restoration of a UE served by multiple IMS networks, according to an embodiment of the disclosure.

Referring to FIG. 4, a method 400 performed by a network node for P-CSCF restoration when the UE is served by a multiple IMS network node. The method 400 may be implemented in any 3GPP system as defined by the third generation partnership project (3GPP), long-term evolution (LTE), 5th generation (5G) standards, and so on. Thus, the 3GPP system may be easily understood by a person skilled in the art.

For the convenience of explanation, the disclosure will hereinafter use terms and definitions defined by the third generation partnership project (3GPP) long-term evolution (LTE), and 5th generation (5G) standards. The disclosure is not, however, limited to the terms and definitions, and may equally apply to any systems that conform to other standards.

Figure 5:
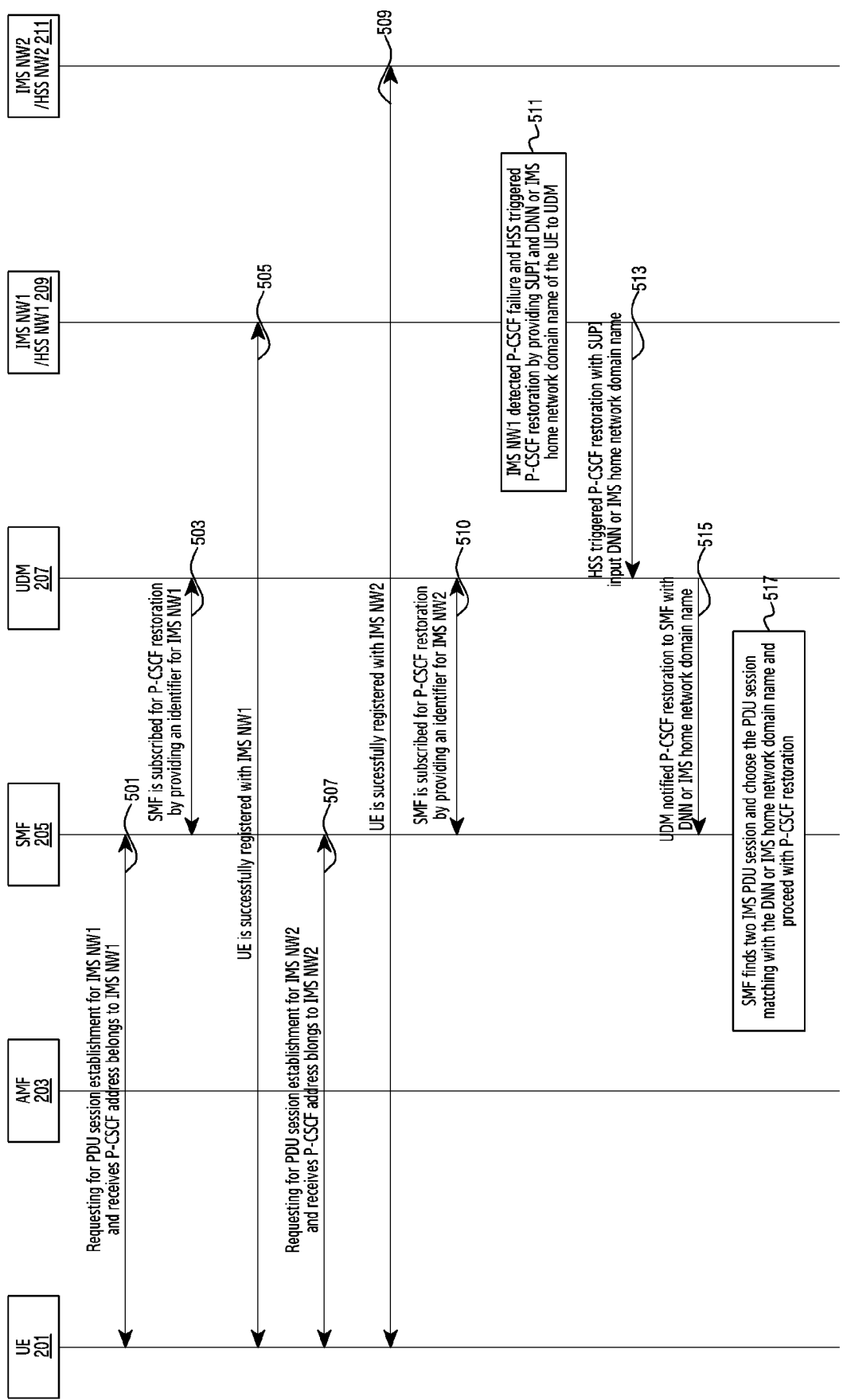
FIG. 5 illustrates an operational flow diagram depicting a process for a SMF based P-CSCF restoration when a UE is served by more than one IMS network, according to an embodiment of the disclosure.

FIG. 5 illustrates an operational flow diagram depicting a process 500 for an SMF based P-CSCF restoration when a UE is served by more than one IMS network, according to an embodiment of the disclosure.

Figure 6:
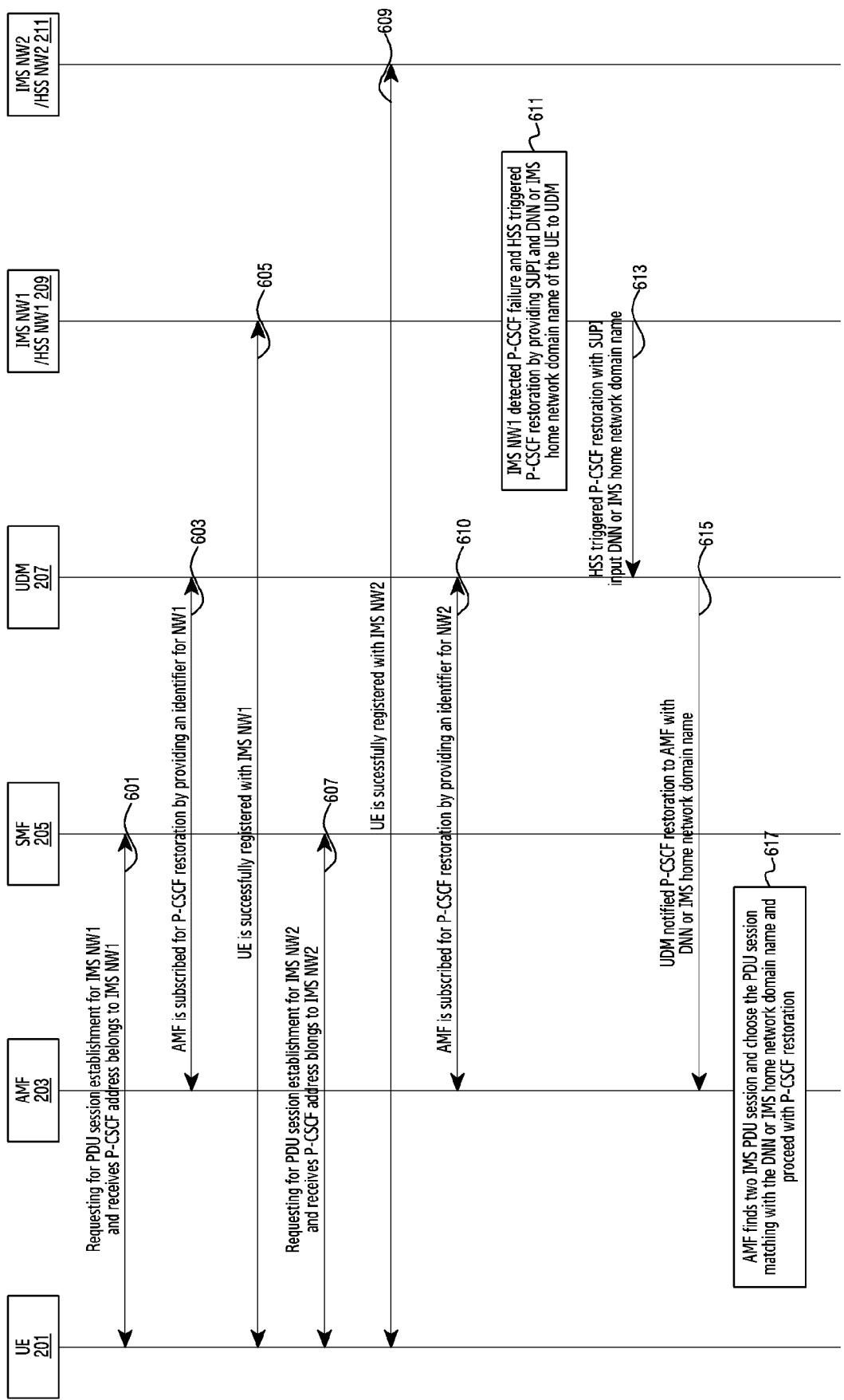
FIG. 6 illustrates an operational flow diagram depicting a process for an AMF based P-CSCF restoration when a UE is served by more than one IMS network, according to an embodiment of the disclosure.

FIG. 6 illustrates an operational flow diagram depicting a process 600 for an AMF-based P-CSCF restoration when a UE is served by more than one IMS network, according to an embodiment of the disclosure.

For ease of understanding and brevity, the explanation of method 400 will be explained with the help of process flows 500 and 600 of FIGS. 4, 5, and 6, respectively for ease of understanding and brevity of the disclosure. Further, the reference numerals are kept the same throughout wherever applicable for ease of understanding.

According to an embodiment of the disclosure, the network node corresponds to the AMF 203 or the SMF 205. The AMF 203 is a network node that manages access to a wireless network and mobility for the UE 201. The SMF 205 is a network node that manages a session for the UE, UE Internet Protocol (IP) address allocation & management (including optional Authorization), selection and control of the User Plane function, and termination of interfaces towards Policy control and Charging functions. The AMF 203 and SMF 205 interact with the UDM 207 for the P-CSCF restoration. The UDM 207 is a network function that stores and manages UE subscription data and stores subscription related information. According to the embodiment, IMS NW1 209 and IMS NW2 211 are the networks with which the UE 201 is registered, and being served by both these IMS networks to provide IMS services. Further, for ease of understanding, only two IMS NW is being shown, however, the UE 201 may be served by multiple IMS NWs. Further, each of the IMS NW interacts with its associated HSS. In a non-limiting example, the HSS for the IMS NW1 is referred to as HSS NW1 209 and the HSS for the IMS NW2 is referred to as HSS NW2 211. Now an operational flow of the method 400 and 500 will be explained in collaboration with each other. According to an embodiment, the HSS is responsible for the user's IMS profile.

Referring to the operation 401 of FIG. 4, the network node receives from the UE 201 a protocol data unit (PDU) session establishment request to establish at least one PDU session between the UE and the multiple IMS networks to get IMS service. In response to the received PDU session establishment request, the network node sends a corresponding P-CSCF address belonging to the IMS NW from which the UE wants to get the IMS service as per TR 23.700-10 conclusion.

Referring to FIGS. 5 and 6, operation 401 of FIG. 4 corresponds to operations 501, 507, 601, and 607 of FIGS. 5 and 6. In particular, referring to FIG. 5, at operation 501 the UE 201 sends a PDU session establishment request to the SMF 205 for IMS NW1 209 for IMS service, and in response, the SMF 205 sends a P-CSCF address belonging to the IMS NW1 209. Similarly, at operation 507 the UE 201 sends a PDU session establishment request to the SMF 205 for the IMS NW2 211 for the IMS service and in response, the SMF 205 sends a P-CSCF address belonging to the IMS NW2 211. Further, referring to FIG. 6, at operation 601 the UE 201 sends a PDU session establishment request to the SMF 205 through the AMF 203 for the IMS NW1 209 for IMS service, and in response, the AMF 203 forwards a P-CSCF address belonging to the IMS NW1 209 received from the SMF 205 to the UE 201. Similarly, at operation 607 the UE 201 sends a PDU session establishment request to the SMF 205 through the AMF 203 for the IMS NW2 211 for the IMS service and in response, the AMF 203 forwards a P-CSCF address belonging to the IMS NW2 211.

At operation 403 of FIG. 4, the network node subscribes with the UDM 207 to receive a notification for the P-CSCF restoration by providing an identifier for each PDU session. In particular, the network node subscribes to receive a notification for P-CSCF restoration. Further, while subscribing with the UDM, the network node provides the identifier to the UDM. According to an embodiment, the identifier is unique for each of the PDU session. According to the methodology, due to the subscription of the network node for receiving the notification for the P-CSCF restoration, the network node may identify an exact PDU session for the same SUPI. This will be explained in the forthcoming paragraphs. Further, the network node is subscribed for triggering the P-CSCF restoration as per the existing TS 23.502.

Referring to FIGS. 5 and 6, operation 403 of FIG. 4 corresponds to operations 503 and 603 of FIGS. 5 and 6. In particular, referring to FIG. 5, at operation 503 the SMF 205 is subscribed for the P-CSCF restoration with the UDM 207 by providing an identifier for IMS NW1 209. Similarly, referring to FIG. 6, at operation 603 the AMF 203 is subscribed for the P-CSCF restoration with the UDM 207 by providing an identifier for IMS NW1 209.

After operations 401 and 403 of FIG. 4, the UE 201 is successfully registered with IMS NWs Thus, according to FIG. 5 at operations 505 and 509, the UE 201 5 is successfully registered with the IMS NW1 209 and the IMS NW2 211 respectively. Accordingly, after successful registration of the UE 201 with IMS NW2 at operation 509, further at operation 510, the SMF 205 subscribes for P-CSCF restoration by providing an identifier for IMS NW2.

Similarly, referring to FIG. 6 at operations 605 and 609, the UE 201 is successfully registered with the IMS NW1 209 and the IMS NW2 211 respectively. Accordingly, after successful registration of the UE 201 with IMS NW2 at operation 609, further at operation 610, the AMF 203 subscribes for P-CSCF restoration by providing an identifier for IMS NW2.

Further, the network node (AMF or SMF) stores a Data Network Name (DNN), an IMS home network domain name, and a P-CSCF address of the corresponding IMS NWs after the successful registration.

Now according to the TS 23.380 when a P-CSCF failure is detected then the HSS triggers the P-CSCF restoration. According to an embodiment, one of the network nodes or the HSS is capable to detect the P-CSCF failure. According to an embodiment, the method 400 of FIG. 4, includes detecting the P-CSCF failure by the network node based on network conditions information that may be received from the corresponding HSS NW.

According to an embodiment, and referring to FIG. 5, at operations 511 and 513, the HSS NW1 209 detects the P-CSCF failure. The HSS NW1 209 then triggers the P-CSCF restoration. The HSS NW1 209 sends a SUPI and a notification, to the UDM 207 along with an identifier, for the triggered P-CSCF restoration. In particular, the identifier is received for each notification. This helps in exactly identifying the PDU session in the SUPI. According to an embodiment, the identifier includes one of a Data Network Name (DNN), an IMS home network domain name, and the P-CSCF address. According to some embodiment, the P-CSCF address that is included in the identifier may be the P-CSCF address of the IMS NW in which the P-CSCF failure is detected. As an example, it was considered that at HSS NW1 failure is detected, however, the P-CSCF failure may be detected at any network node. The detection of the P-CSCF failure at HSS NW1 should be considered a non-limiting embodiment.

According to a further embodiment, and referring to FIG. 6, similar to operations 511 and 513, the HSS NW1 209 detects the P-CSCF failure in operations 611 and 613. The HSS NW1 209 then triggers the P-CSCF restoration. The HSS NW1 209 sends a SUPI and a notification, to the UDM 207 along with an identifier, for the triggered the P-CSCF restoration. In particular, the identifier is received for each notification. This helps in exactly identifying the PDU session in the SUPI. According to an embodiment, the identifier includes one of Data Network Name (DNN), an IMS home network domain name, and the P-CSCF address. According to some embodiment, the P-CSCF address that is included in the identifier may be the P-CSCF address of the IMS NW in which the P-CSCF failure is detected.

According to an embodiment, the UDM 207 sends a notification, to the network node, along with the received identifier from the HSS NW1 209. Thus, as shown in the operation 515 of FIG. 5, the UDM 207 sends a notification, to the SMF 205, along with the received identifier from the HSS NW1 209. Similarly, as shown in the operation 615 of FIG. 6, the UDM 207 sends a notification, to the AMF 203, along with the received identifier from the HSS NW1 209.

According to an embodiment, the network node receives the notification for the P-CSCF restoration from the UDM 207. Thus, at operation 405 of FIG. 4, the network node receives the notification for the P-CSCF restoration from the UDM 207 based on the subscription with UDM as per operation 403. Further, operations 511 and 513 of FIG. 5 forms an intermediate operation between 403 and 405 of FIG. 4, when the network node is the SMF. Similarly, operations 611 and 613 of FIG. 6, form an intermediate operation between 403 and 405 of FIG. 4, when the network node is the AMF.

Now after receiving the notification and the identifier from the UDM 207, the network node identifies a PDU session t of the UE from the multiple IMS networks based on a matching of a stored identifier with the identifier received from the HSS NW. As explained earlier, the network node also stores the identifier during initial PDU session establishment by UE and when the identifier from the HSS NW is received, the network node matches its identifier with the received identifier so that an exact PDU session is identified. Accordingly, when the network node finds more than one PDU session for the same SUPI, then based on the matching of a stored identifier with the identifier received from the HSS NW, the network node chooses the PDU session matching with the DNN, IMS home network, the P-CSCF address.

According to the embodiment, and referring to FIG. 5, after receiving the notification and the identifier from the UDM 207, at operation 517, the SMF 205 (network node) identifies a PDU session of the UE from the multiple IMS networks based on a matching of a stored identifier with the identifier received from the HSS NW. The identifier that is received from the HSS NW is then matched with the identifier that is stored in the SMF 205 after the successful PDU session establishment. Based on the matching of the stored identifier with the identifier received from the HSS NW, the network node chooses the PDU session matching with the DNN, IMS home network, and the P-CSCF address.

Similarly, according to the embodiment, and referring to FIG. 6, after receiving the notification and the identifier from the UDM 207, at operation 617, the AMF 203 (network node) identifies a PDU session of the UE from the multiple IMS networks based on a matching of a stored identifier with the identifier received from the HSS NW. The identifier that is received from the HSS NW is then matched with the identifier that is stored in the AMF 203 after the successful PDU session establishment. Based on the matching of the stored identifier with the identifier received from the HSS NW, the network node chooses the PDU session matching with the DNN, IMS home network, and the P-CSCF address.

Thereafter, at operation 407 of FIG. 4, the network node (AMF) performs, the P-CSCF restoration for the PDU session of the UE based on the received notification from the UDM 207 for the P-CSCF restoration.

According to some embodiment, the UDM 207 identifies the PDU session from the multiple IMS networks based on a matching of the stored identifier with the identifier received from the HSS and the triggered P-CSCF restoration. Thereafter, the UDM 207 sends the notification for the triggered P-CSCF restoration to the network node as shown in operations 515 and 615 of FIGS. 5 and 6 respectively. The rest of the operations remain the same according to the flow operation shown in FIGS. 5 and 6.

According to some embodiment, the network node detects the P-CSCF restoration failure in at least one of an IMS network from the multiple IMS networks based on the network condition information. According to this embodiment, the detection of P-CSCF failure by the SMF 205 is based on a reception of a message from a Policy and Charging Rules Function/Policy Control Function (PCRF/PCF) node or from a User Plane Function. Thus, based on the message received from the (PCRF/PCF) node and the User Plane Function, the SMF 205 detects the P-CSCF restoration failure. The SMF 205 then identifies a PDU session of the UE 201 from the multiple IMS networks based on a matching of a stored identifier with an input using which the network node detected the P-CSCF failure. The input may be the identifier received from another PCRF/PCF node or from the UPF. Further, the identifier may additionally include one of a Data Network Name (DNN), an IMS home network domain name, and a P-CSCF address corresponding to the IMS network for which the P-CSCF restoration failure is detected. Thereafter, the SMF 205 proceed with the P-CSCF restoration based on the identified PDU session.

Figure 7A:
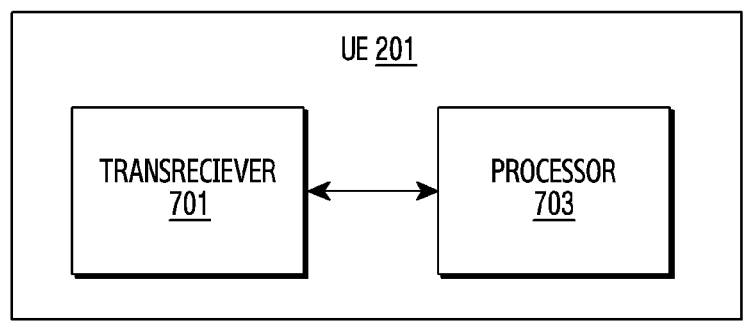
FIG. 7A illustrates a system architecture of UE according to an embodiment of the disclosure.

FIG. 7A illustrates a system architecture of UE according to an embodiment of the disclosure.

Referring to FIG. 7A, UE 201 may include a transceiver 701 and a processor 703. The transceiver 701 may operate in a communication method of the UE 201 as described above. Elements of UE 201 are not, however, limited thereto. For example, the UE 201 may include more (e.g., a memory) or fewer elements than described above.

The transceiver 701 may transmit or receive signals to or from another Network Function (NF) entity, e.g., an AMF/UDM/HSS/SMF. For signal transmission or reception to or from the other NF entity, the transceiver 701 may include a Radio Frequency (RF) transmitter for up-converting the frequency of a signal to be transmitted and amplifying the signal and an RF receiver for low-noise amplifying a received signal and down-converting the frequency of the received signal. It is merely an example of the transceiver 701, and the elements of the transceiver 701 are not limited to the RF transmitter and RF receiver.

In addition, the transceiver 701 may receive a signal on a wired channel or wireless channel and output the signal to the processor 703 or transmit signal output from the processor 803 on a wired channel or wireless channel A memory (not shown) may store a program and data required for the operation of the UE 201. Furthermore, the memory may store control information or data included in a signal obtained by the UE 201. The memory may include a storage medium such as but is not limited to a read-only memory (ROM), a random-access memory (RAM), a hard disk, a compact disc ROM (CD-ROM), and a digital versatile disc (DVD), or a combination of storage mediums.

The processor 703 may control a series of processes for the UE 201 to operate in accordance with the embodiments of the disclosure. The processor 703 may include a controller or one or more processors.

Figure 7B:
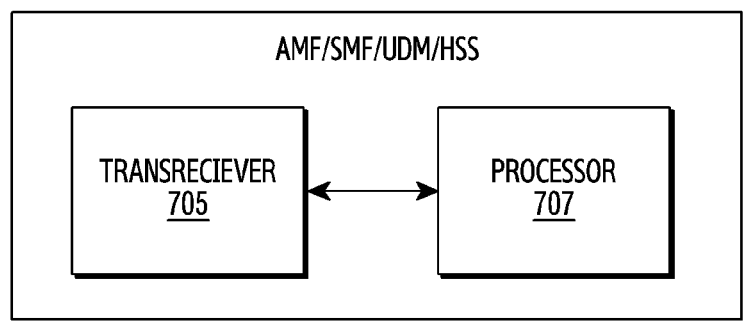
FIG. 7B illustrates a system architecture of AMF/UDM/SMF/HSS according to an embodiment of the disclosure.

FIG. 7B illustrates a system architecture of AMF/UDM/SMF/HSS according to an embodiment of the disclosure.

Referring to FIG. 7B, AMF/UDM/SMF/HSS may include a transceiver 705 and a processor 707. Further, the functions and the working of the transceiver 705 and a processor 707 are the same as the working of the transceiver 701 and processor 703 as explained above therefore for the sake of brevity the explanation of the same is omitted here. Further, methods 400, 500, and 600, are implemented in the system architecture as shown in the 7B. Therefore, for the sake of brevity, the detailed operation of the same is omitted here.

Figure 8:
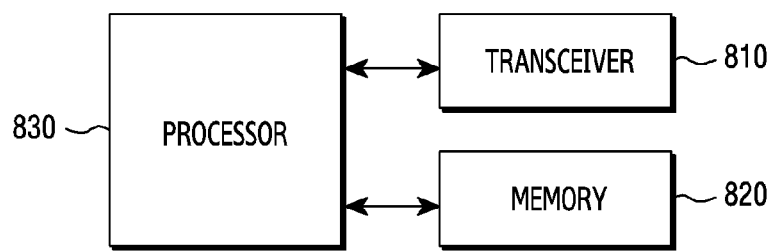
FIG. 8 illustrates a block diagram illustrating a structure of a UE according to an embodiment of the disclosure.

FIG. 8 illustrates a block diagram illustrating a structure of a UE according to an embodiment of the disclosure. FIG. 8 corresponds to the example of the UE of FIG. 7A.

Referring to FIG. 8, the UE according to an embodiment may include a transceiver 810, a memory 820, and a processor 830. The transceiver 810, the memory 820, and the processor 830 of the UE may operate according to a communication method of the UE described above. However, the components of the UE are not limited thereto. For example, the UE may include more or fewer components than those described above. In addition, the processor 830, the transceiver 810, and the memory 820 may be implemented as a single chip. Also, the processor 830 may include at least one processor.

The transceiver 810 collectively refers to a UE receiver and a UE transmitter, and may transmit/receive a signal to/from a base station or a network entity. The signal transmitted or received to or from the base station or a network entity may include control information and data. The transceiver 810 may include a RF transmitter for up-converting and amplifying a frequency of a transmitted signal, and a RF receiver for amplifying low-noise and down-converting a frequency of a received signal. However, this is only an example of the transceiver 810 and components of the transceiver 810 are not limited to the RF transmitter and the RF receiver.

Also, the transceiver 810 may receive and output, to the processor 830, a signal through a wireless channel, and transmit a signal output from the processor 830 through the wireless channel.

The memory 820 may store a program and data required for operations of the UE. Also, the memory 820 may store control information or data included in a signal obtained by the UE. The memory 820 may be a storage medium, such as read-only memory (ROM), random access memory (RAM), a hard disk, a CD-ROM, and a DVD, or a combination of storage media.

The processor 830 may control a series of processes such that the UE operates as described above. For example, the transceiver 810 may receive a data signal including a control signal transmitted by the base station or the network entity, and the processor 830 may determine a result of receiving the control signal and the data signal transmitted by the base station or the network entity.

Figure 9:
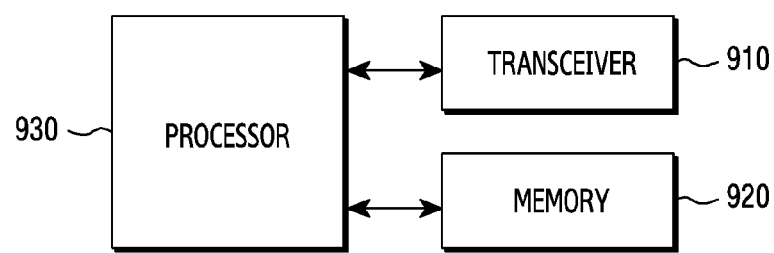
FIG. 9 illustrates a block diagram illustrating a structure of a network entity according to an embodiment of the disclosure.

FIG. 9 illustrates a block diagram illustrating a structure of a network entity according to an embodiment of the disclosure. FIG. 9 corresponds to the example of the network entity of FIG. 7B.

Referring to FIG. 9, the network entity according to an embodiment may include a transceiver 910, a memory 920, and a processor 930. The transceiver 910, the memory 920, and the processor 930 of the network entity may operate according to a communication method of the network entity described above. However, the components of the network entity are not limited thereto. For example, the network entity may include more or fewer components than those described above. In addition, the processor 930, the transceiver 910, and the memory 920 may be implemented as a single chip. Also, the processor 930 may include at least one processor.

The transceiver 910 collectively refers to a network entity receiver and a network entity transmitter, and may transmit/receive a signal to/from a terminal or a base station. The signal transmitted or received to or from the terminal or a base station may include control information and data. The transceiver 910 may include a RF transmitter for up-converting and amplifying a frequency of a transmitted signal, and a RF receiver for amplifying low-noise and down-converting a frequency of a received signal. However, this is only an example of the transceiver 910 and components of the transceiver 910 are not limited to the RF transmitter and the RF receiver.

Also, the transceiver 910 may receive and output, to the processor 930, a signal through a wireless channel, and transmit a signal output from the processor 930 through the wireless channel.

The memory 920 may store a program and data required for operations of the network entity. Also, the memory 920 may store control information or data included in a signal obtained by the network entity. The memory 920 may be a storage medium, such as read-only memory (ROM), random access memory (RAM), a hard disk, a CD-ROM, and a DVD, or a combination of storage media.

The processor 930 may control a series of processes such that the network entity operates as described above. For example, the transceiver 910 may receive a data signal including a control signal transmitted by the terminal, and the processor 930 may determine a result of receiving the control signal and the data signal transmitted by the terminal.

In a firmware or software configuration, the method and the communication according to the embodiments of the disclosure may be implemented in the form of modules, procedures, functions, etc. performing the above-described functions or operations. Instructions may be stored in a memory unit and executed by a processor. The memory unit may be located at the interior or exterior of the processor and may transmit and receive data to and from the processor via various known means.

Those skilled in the art will appreciate that the operations described herein in the disclosure may be carried out in other specific ways than those set forth herein without departing from essential characteristics of the disclosure. The above-described embodiments are therefore to be construed in all aspects as illustrative and not restrictive. The scope of the disclosure should be determined by the appended claims, not by the above description, and all changes coming within the meaning of the appended claims are intended to be embraced therein.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a session management function (SMF) node in a wireless communication system, the method comprising:
   receiving, from a user equipment (UE), a protocol data unit (PDU) session establishment request for establishing at least one PDU session between the UE and an internet protocol (IP) multimedia subsystem (IMS) network among multiple IMS networks;
   transmitting, to a unified data manager (UDM) node, an identifier corresponding to a PDU session among the at least one PDU session, wherein the identifier includes an IMS home network domain name;
   receiving, from the UDM node, a notification for a proxy-call session control function (P-CSCF) restoration based on the identifier; and
   performing, the P-CSCF restoration for the PDU session based on the received notification for the P-CSCF restoration.

2. The method of claim 1, wherein the identifier further includes at least one of a data network name (DNN) or a P-CSCF address.

3. The method of claim 2, wherein the receiving of the notification for the P-CSCF restoration from the UDM node is based on a triggering of the P-CSCF restoration by a home subscriber server (HSS).

4. The method of claim 1, further comprising:
storing the identifier during an initial PDU session establishment by the UE with the multiple IMS networks.

5. The method of claim 1, further comprising:
detecting a P-CSCF restoration failure in at least one IMS network from the multiple IMS networks based on network condition information;
identifying the PDU session of the UE from the multiple IMS networks based on a matching of a stored identifier with an identifier received from a home subscriber server (HSS); and
performing the P-CSCF restoration for the identified PDU session.

6. The method of claim 5, wherein the detection of the P-CSCF failure is based on a reception of a message from policy and charging rules function/policy control function (PCRF/PCF) node or from a user plane function (UPF) node.

7. A session management function (SMF) node in a wireless communication system, the SMF node comprising:
a transceiver; and
a controller coupled with the transceiver, the controller configured to:
receive, from a user equipment (UE), a protocol data unit (PDU) session establishment request for establishing at least one PDU session between the UE and an internet protocol (IP) multimedia subsystem (IMS) network among multiple IMS networks,
transmitting, to a unified data manager (UDM) node, an identifier corresponding to a PDU session among the at least one PDU session, wherein the identifier includes an IMS home network domain name,
receive, from the UDM node, a notification for a proxy-call session control function (P-CSCF) restoration based on the identifier, and
perform, the P-CSCF restoration for the PDU session of the UE based on the received notification for the P-CSCF restoration.

8. The SMF node of claim 7, wherein the identifier further includes at least one of a data network name (DNN) or a P-CSCF address.

9. The SMF node of claim 8, wherein the reception of the notification for the P-CSCF restoration from the UDM node is based on a triggering of the P-CSCF restoration by a home subscriber server (HSS).

10. The SMF node of claim 7, wherein the controller is further configured to:
Store the identifier during an initial PDU session establishment by the UE with the multiple IMS networks.

11. The SMF node of claim 7, wherein the controller is further configured to:
detect a P-CSCF restoration failure in at least one IMS network from the multiple IMS networks based on network condition information,
identify the PDU session of the UE from the multiple IMS networks based on a matching of a stored identifier with an identifier received from a home subscriber server (HSS), and
perform the P-CSCF restoration for the identified PDU session.

12. The SMF node of claim 11, wherein the detection of the P-CSCF failure is based on a reception of a message from policy and charging rules function/policy control function (PCRF/PCF) node or from a user plane function (UPF) node.

* * * * *